(12) United States Patent
Sawano (10) Patent No.: US 8,826,239 B2
(45) Date of Patent: Sep. 2, 2014

(54) ASYNCHRONOUS CODE TESTING IN INTEGRATED DEVELOPMENT ENVIRONMENT (IDE)

(75) Inventor: Yoshiaki Sawano, Zama (JP)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/899,043

(22) Filed: Oct. 6, 2010

(65) Prior Publication Data
US 2012/0089964 A1    Apr. 12, 2012

(51) Int. Cl.
*G06F 11/36* (2006.01)
(52) U.S. Cl.
CPC ........ *G06F 11/3688* (2013.01); *G06F 11/3684* (2013.01)
USPC .......................................... 717/126; 717/127
(58) Field of Classification Search
CPC .............. G06F 9/44589; G06F 11/362; G06F 11/3466; G06F 11/3409; G06F 11/3419; G06F 11/3476
See application file for complete search history.

(56) References Cited

U.S. PATENT DOCUMENTS

| | | | | |
|---|---|---|---|---|
| 5,390,325 | A * | 2/1995 | Miller ........................ | 714/38.14 |
| 6,256,773 | B1 * | 7/2001 | Bowman-Amuah .......... | 717/121 |
| 6,510,402 | B1 * | 1/2003 | Logan et al. .................. | 702/186 |
| 7,360,202 | B1 * | 4/2008 | Seshadri et al. .............. | 717/106 |
| 7,490,319 | B2 * | 2/2009 | Blackwell et al. ............ | 717/124 |
| 2004/0153830 | A1 * | 8/2004 | Cebula et al. ................... | 714/38 |
| 2005/0081106 | A1 * | 4/2005 | Chang et al. ..................... | 714/38 |
| 2005/0144593 | A1 * | 6/2005 | Raghuvir et al. ............. | 717/124 |
| 2005/0223361 | A1 * | 10/2005 | Belbute ......................... | 717/124 |
| 2006/0010429 | A1 * | 1/2006 | Ihara ............................. | 717/126 |
| 2006/0059457 | A1 * | 3/2006 | Pandit ........................... | 717/106 |
| 2006/0218446 | A1 | 9/2006 | Crawford | |
| 2007/0300208 | A1 * | 12/2007 | Furukawa et al. ............ | 717/127 |
| 2009/0103902 | A1 * | 4/2009 | Matsuura et al. ............. | 386/124 |
| 2009/0204849 | A1 | 8/2009 | Shimura | |

FOREIGN PATENT DOCUMENTS

| | | |
|---|---|---|
| JP | 19957219980 A | 8/1995 |
| JP | 19979218805 A | 8/1997 |
| JP | 199810214204 A | 8/1998 |
| JP | 199810269104 A | 10/1998 |
| JP | 199911259280 A | 9/1999 |
| JP | 2007316875 A | 12/2007 |

* cited by examiner

*Primary Examiner* — Lewis A Bullock, Jr.
*Assistant Examiner* — Keith C Yuen
(74) *Attorney, Agent, or Firm* — Schmeiser, Olsen & Watts, LLP; John Pivnichny (57) ABSTRACT

A system and associated method for asynchronous code testing in an Integrated Development Environment (IDE). The IDE has components of a source code editor, an impact analyzer, a test case launcher, a graphical user interface (GUI), and a database. All components run concurrently for asynchronous and real-time code editing. Upon modification of a code block of an input code, a test case is automatically generated and a launching priority is calculated based on the relationship between the modified code block and each code block affected by the modification. Generated test cases are automatically run by the test case launcher or manually selected by the user to produce a test run result.

13 Claims, 8 Drawing Sheets

| TEST CASE ID A | CODE BLOCK 1 A1 |
|---|---|
| | ... |
| | CODE BLOCK M AM |
| TEST CASE LAUNCHING PRIORITY B | |

FIG. 5B

| TC_001 | SRC_001 | SRC_001_001 | 1 | 8 |
|---|---|---|---|---|
| | SRC_001 | SRC_001_002 | 2 | |
| | SRC_002 | SRC_002_034 | 5 | |
| TC_002 | SRC_001 | SRC_001_001 | 1 | 18 |
| | SRC_001 | SRC_001_002 | 2 | |
| | SRC_002 | SRC_002_034 | 5 | |
| | SRC_002 | SRC_002_050 | 10 | |
| ... | ... | ... | ... | ... |
| TC_ID_J | CB_CP 1 | CB_ID 1 | CB_AS 1 | TC_LP_J |
| | ... | ... | ... | |
| | CB_CP K | CB_ID K | CB_AS K | |
| | ... | ... | ... | |
| ... | ... | ... | ... | ... |

ASYNCHRONOUS CODE TESTING IN INTEGRATED DEVELOPMENT ENVIRONMENT (IDE)

BACKGROUND OF THE INVENTION

The present invention discloses a system and associated method for asynchronously testing program code while developing a computer program in an integrated programming tool, which is commonly referred to as an Integrated Development Environment (IDE). In a conventional computer program development model, programmers repeat a typical cycle of inputting program code, converting the program code into executable format, and running the executable program code to verify the program code for intended results. Because the program code comprises multiple modules that invoke one another and exchange data upon return, debugging the program code is inefficient and labor-intensive even with conventional IDE tools.

BRIEF SUMMARY

According to one embodiment of the present invention, a method for asynchronous code testing in an Integrated Development Environment (IDE) comprises: a processor of a computer creating an input code in a database pursuant to inputs provided by a user through a source code editor, wherein the IDE comprises the source code editor, an impact analyzer, a test case launcher, and a graphical user interface (GUI), and wherein the database is coupled to the computer hosting the IDE; generating a test case list from the input code by use of the impact analyzer, wherein the impact analyzer runs concurrently with the source code editor such that the test case list is generated immediately after the user modifies a code block of the input code, wherein each test case of the test case list comprises at least one test case comprising a respective test case identifier and a respective launching priority, wherein the respective launching priority quantifies how strongly each test case is associated with the modified code block, said each test case is uniquely identified by the respective test case identifier; producing a test run result for the modified code block by asynchronously running said at least one test case of the test case list by use of the test case launcher based on the respective launching priority of each test case; and communicating the test run result to the user via the GUI.

According to one embodiment of the present invention, a computer program product comprises a computer readable memory unit that embodies a computer readable program code. The computer readable program code contains instructions that, when run by a processor of a computer system, implement a method for asynchronous code testing in an Integrated Development Environment (IDE).

According to one embodiment of the present invention, a computer system comprises a processor and a computer readable memory unit coupled to the processor, wherein the computer readable memory unit containing instructions that, when run by the processor, implement a method for asynchronous code testing in an Integrated Development Environment (IDE).

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for asynchronous code testing in an Integrated Development Environment (IDE).

DETAILED DESCRIPTION

Figure 1:
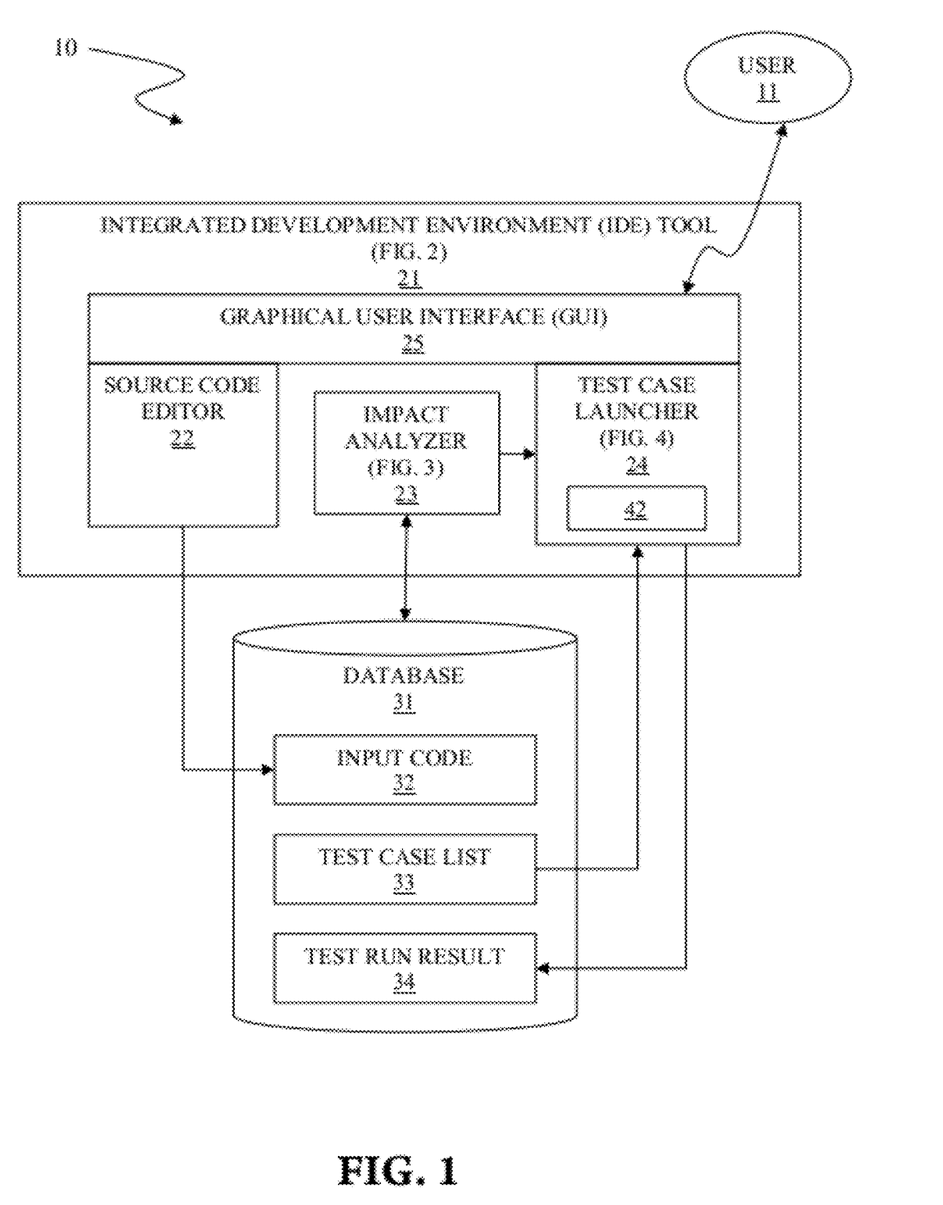
FIG. 1 illustrates a system for asynchronous code testing in an Integrated Development Environment (IDE), in accordance with embodiments of the present invention.

FIG. 1 illustrates a system 10 for asynchronous code testing in an Integrated Development Environment (IDE) 21, in accordance with embodiments of the present invention.

The system 10 comprises a user 11, the integrated development environment (IDE) tool 21, and a database 31 coupled to the IDE tool 21. In one embodiment of the present invention, the database 31 is allocated from storage/memory devices of a computer system that hosts the IDE tool 21. See descriptions of FIG. 7 infra for details of components of the computer system employed.

The IDE tool 21 comprises a source code editor 22, an impact analyzer 23, a test case launcher 24, and a graphical user interface (GUI) 25. The IDE tool 21 further comprises typical components of conventional IDE tools such as compiler, loader, linker, etc., which are not described in this specification. See description of FIG. 2, infra, for steps performed by the IDE tool 21.

IDE tools are typically employed in a software development project to improve programming efficiency and productivity of programmers. Examples of conventional integrated development environment (IDE) tools may be, inter alia, Eclipse™, IBM® Rational® Application Developer (RAD), Microsoft® .NET™ Visual Studio®, etc. (Eclipse is a trademark of the Eclipse Foundation in the United States and other countries; IBM and Rational are registered trademarks of International Business Machines Corporation in the United States and other countries; Microsoft, Visual Studio, and .NET are registered trademarks or a trademark of Microsoft Corporation in the United States and other countries.)

The user 11 interacts with the IDE tool 21 through the GUI 25, to create and to edit an input code 32 in the database 31 and to operate the test case launcher 24 in running one or more test case generated by the impact analyzer 23.

The input code 32 is a subject code that the user 11 is developing as a portion of a software project. In typical software development methods, the user 11 repeats a cycle of editing the subject code and testing the subject code to see if the subject code produces intended result. Once the user 11 modifies the subject code, the user 11 also needs to write a test case corresponding to the change of the subject code. The test case is a combination of data values and conditions for respective variables appearing in the subject code to examine how the modified subject code behaves and to acquire a result generated by the modified subject code. In running the test cases, conventional IDE tools utilize a sequential or synchronous running mode, in which a caller in the subject code waits for a callee to return to proceed with the program flow. As opposed to the sequential running mode, when the subject code runs in an asynchronous running mode, the caller in the subject code does not wait for the callee to return but proceeds with next step after invoking the callee. Each invoked module also referred to as callee module or simply a callee, runs in a thread separate from the thread of the caller module. The callee terminates the thread of the callee and returns control back to the caller module after the callee completes running. Usually time consuming operations run asynchronously, as in background processing in a multi-threaded processing environment.

In this specification, the term "test case" is defined as a set of conditions and/or instances of variables relevant to modified code blocks such that the user can determine whether the subject code operates correctly and produces a result that the user had intended in modifying the subject code. A typical test case format in software engineering comprises, inter alia, a test case identifier, description, step number/order of run, prerequisite(s), depth, flag, etc. IBM WebSphere® Studio Asset Analyzer (WSAA) is an example of commercially available IT maintenance tool that provides automatic analysis as to dependencies within and among enterprise applications, including mainframe, Java®, and composite applications. (WebSphere is a registered trademark of International Business Machines Corporation in the United States and other countries; Java is a trademark or registered trademark of Sun Microsystems in the United States and other countries) In one embodiment of the present invention, the test case format employs JUnit model for Java programming language, as used by importing the JUnit test case class "org.junit.Test".

The impact analyzer 23 automatically analyzes the input code 32 upon the input code 32 being updated by the user 11 into the database 31. The impact analyzer 23 subsequently generates a test case list 33 comprising at least one pair of a test case and a respectively associated launching priority, that is (test case, launching priority), and stores the test case list in the database 31. See description of FIG. 3, infra, for steps performed by the impact analyzer 23 and details of the test case list 33. See FIG. 5C infra for an example of a test case list 33.

Each code block of the input code 32 is related with a code block of the input code 32 that has been modified by the user 11. Code blocks are defined by the programming language employed in the input code 32 by the user 11. A respective degree of association between the modified code block and each code block is determined pursuant to the structure of the programming language employed in the input code 32. In this specification, the term "code block" is defined as an identifiable programming element or unit. A respective degree of association between the modified code block and each code block of the input code 32 is quantified as a respective association strength value for each code block. Factors accounted in calculating the association strength may be, inter alia, nesting level of a code block referred to as a depth, a number of callers invoking the code block, a frequency of invocation, etc.

The impact analyzer 23 generates each test case based on code block unit, and calculates the respective launching priority of each test case to collectively represent the sum/priority of all association strengths between code blocks in the test case and the modified code block. Accordingly, if a test case comprises a code block that is strongly associated with the modified code block, then the launching priority of the test case reflects such strong association between two code blocks.

The test case launcher 24 retrieves the test case list 33 generated by the impact analyzer 23 from the database 31 and runs test cases of the test case list 33 in various running modes. The test case launcher 24 stores the test case list 33 in a run queue 42, in which the test cases in the test case list 33 are ordered by the respectively associated launching priority for each test case. See description of FIG. 4, infra, for steps performed by the test case launcher 24.

In one embodiment of the present invention, the test case launcher 24 runs a test case selected by the user 11 through the GUI 25. The test case launcher 24 pops the run queue 42 upon being triggered by the user to perform each test case to generate a test run result 34. In other embodiment of the present invention, the test case launcher 24 automatically runs test cases of the test case list 33 according to the respectively associated launching priority for each test case. In the same embodiment of the present invention, once the user 11 updates a code block in the input code 32 and a context of related test case is completed, the user 11 can see the test run result 34 instantaneously, since the impact analyzer 23 and the test case launcher 24 operates seamlessly in real-time without any user interaction.

The database 31 stores the input code 32 provided by the user 11, the test case list 33 generated by the impact analyzer 23, and the test run result 34 generated by the test case launcher 24. The user 11 modifies the input code 32 by use of the GUI 25 and the source code editor 22. The impact analyzer 23 stores the test case list 33 in the database 31 for the test case launcher 24 to access. In embodiments of the present invention wherein the impact analyzer 23 and the test case launcher 24 run on a same platform, the database 31 may be implemented as a local memory device for real-time responses.

The present invention may be implemented as a component in the IDE 21 for improving debugging efficiency/work productivity for a software project, particularly in a unit test phase rather than an integration test phase of software development. By automatically running test cases for each update in the input code, the user can save time for creating and performing test cases for the update made in the input code. Automatic testing of each update during coding phase also reduces chance of cumulative errors, and consequently enables easier identification of causes of a failure in the updated input code. Also by asynchronously running test cases, the test results can be generated without delay caused by callee operations in testing the updated code block in the input code. Conventional unit test frameworks for various programming languages are, inter alia, JUnit for Java, CUnit for C-Language, the Eclipse™ Process Framework (EPF) by the Eclipse Foundation. (Eclipse is a trademark or registered trademark of the Eclipse Foundation in the United States and other countries) The present invention enables the user to see a result of modifying the input code in real-time without separately testing the modified input code.

Figure 2:
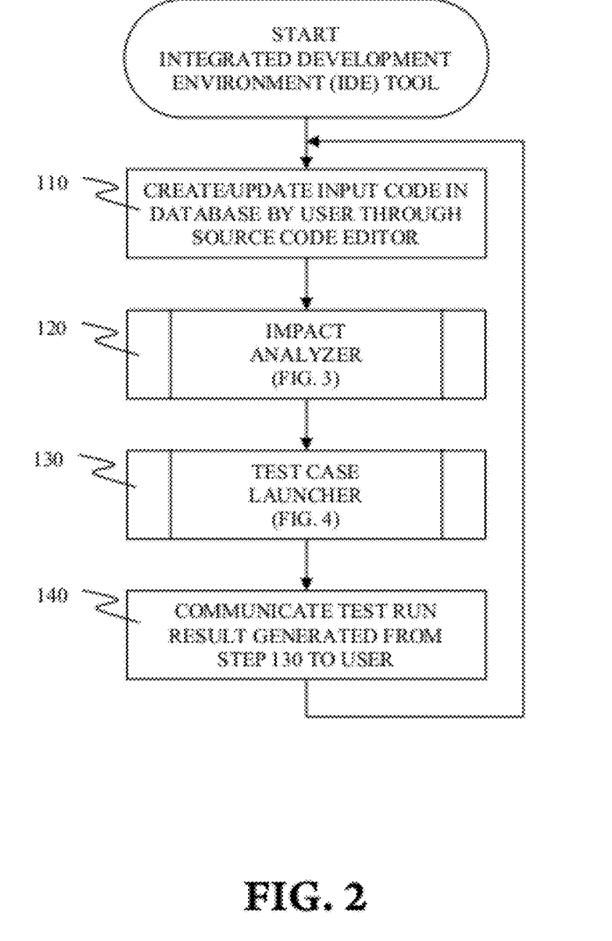
FIG. 2 is a flowchart depicting a method for asynchronous code testing as performed by the Integrated Development Environment (IDE) tool of FIG. 1, in accordance with the embodiments of the present invention.

FIG. 2 is a flowchart depicting a method for asynchronous code testing as performed by the integrated development environment (IDE) tool of FIG. 1, supra, in accordance with the embodiments of the present invention.

In step 110, the IDE tool creates the input code in the database and/or any other memory device based on user input via the source code editor, if the input code does not exist in the database and/or any other memory device. If the input code already exists in the database and/or any other memory device, the IDE tool updates the input code stored in the database based on the user input. The IDE tool proceeds with step 120.

In step 120, the impact analyzer of the IDE tool generates a test case list corresponding to the input code created/updated in step 110. The test case list comprises at least one test case and a respective launching priority associated with each test case of said at least one test case. The impact analyzer runs concurrently with the source code editor while the user edits the input code via the source code editor. The impact analyzer is triggered to analyze an update in the input code upon detecting the update of the input code from the source code editor. See description of FIG. 3, infra, for steps performed by the impact analyzer. The IDE tool proceeds with step 130.

In step 130, the IDE tool performs the test case launcher to generate a test run result by running the test case list created by the impact analyzer in step 120. In one embodiment of the present invention, the test case launcher is configured to automatically run the test case list according to launching priorities. In other embodiment of the present invention, the test case launcher is configured to run an entry of the test case list as selected by the user through the graphical user interface (GUI) of the test case launcher. See description of FIG. 4, infra, for steps performed by the test case launcher. The IDE tool proceeds with step 140.

In step 140, the IDE tool communicates the test run result generated by the test case launcher in step 130 to the user through the GUI of the test case launcher. See FIG. 6 and accompanying description for an example of the test case launcher user interface. The IDE tool completes asynchronous code testing for the updates made to the input code in step 110. The IDE tool may repeat steps 110 through 140 if the user revises the input code in the database.

Figure 3:
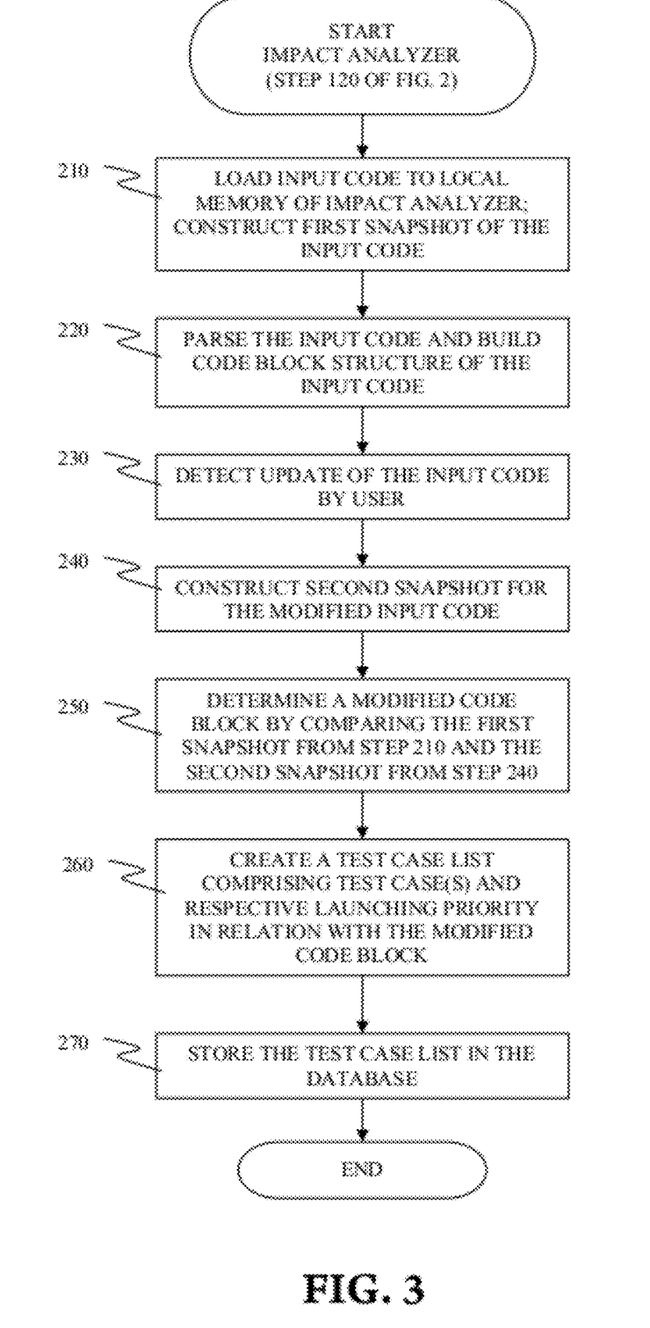
FIG. 3 is a flowchart depicting a method for analyzing code block structure of an update to the input code, as performed by the impact analyzer in step 120 of FIG. 2, in accordance with the embodiments of the present invention.

FIG. 3 is a flowchart depicting a method for analyzing code block structure of an update to the input code, as performed by the impact analyzer in step 120 of FIG. 2, supra, in accordance with the embodiments of the present invention.

In step 210, the impact analyzer loads the input code to local memory of the impact analyzer from the database and/or other memory device. The impact analyzer subsequently constructs a first snapshot corresponding to the loaded input code. In this specification, the term "snapshot" is defined as a set of data captured from the run stack of the impact analyzer comprising the latest input code as displayed through the source code editor. In the context of debugging, the term snapshot is more broadly used to indicate thread status in Java Virtual Machine (JVM) in Java stack trace. Although content of the run stack of any process is temporary, a snapshot constructed with the run stack content is kept stable and accessible as ordinary piece of data. The impact analyzer proceeds with step 220.

In step 220, the impact analyzer parses the first snapshot of step 210 and builds a code block structure of the first snapshot. The code block structure is determined pursuant to syntax of a programming language employed for the input code. See FIGS. 5, 5A, 5B, and 5C infra for examples of a code block structure wherein the input code utilizes the Java programming language. The code block structure may be referred to as call path information in this specification. The impact analyzer proceeds with step 230.

In step 230, the impact analyzer detects an update of the input code by the user, wherein the user had modified the program code within the source code editor. In one embodiment of the present invention, the source code editor is configured to notify the impact analyzer of an update to the input code when the user pauses typing for a predefined period of time after completing a programming element of the input code. For example, if the user pauses for 15 seconds after typing "print (a);" the impact analyzer detects an update to the input code. The impact analyzer proceeds with step 240.

In step 240, the impact analyzer constructs a second snapshot corresponding to the modified input code as detected in step 230. The impact analyzer proceeds with step 250.

In step 250, the impact analyzer determines a modified code block by comparing the first snapshot from step 210 and the second snapshot from step 240. The impact analyzer proceeds with step 260.

In step 260, the impact analyzer creates a test case list comprising at least one pair of a test case and a launching priority respectively associated with each test case, notated as (test case, launching priority), based on the code block structure built in step 220. Each test case comprises one or more pair of (code block, association strength), wherein the first argument "code block" identifies a code block that has been affected by the changes between the second snapshot and the first snapshot, and wherein the second argument "association strength" quantifies how strongly the code block identified as the first argument is associated with the modified code block. The launching priority of a test case is calculated to collectively represent the sum/priority of all association strengths of all affected code blocks in the test case. The impact analyzer proceeds with step 270.

In one embodiment of the present invention, the impact analyzer denotes a code block in a test case with a tuple (source file id, code block id). In the same embodiment of the present invention, the second parameter code block id further comprises call path information. See FIGS. 5B and 5C, infra, for respective examples of an entry for the test case list and an instance of the test case list.

In step 270, the impact analyzer stores the test case list generated in step 260 in the database and/or other high speed memory device such that the test case launcher runs the test cases in real-time. In other embodiment of the present invention, the impact analyzer may directly communicate the generated test case list to the test case launcher. The impact analyzer completes processing the update of the input code and the IDE tool proceeds with step 130 of FIG. 2, supra.

Figure 4:
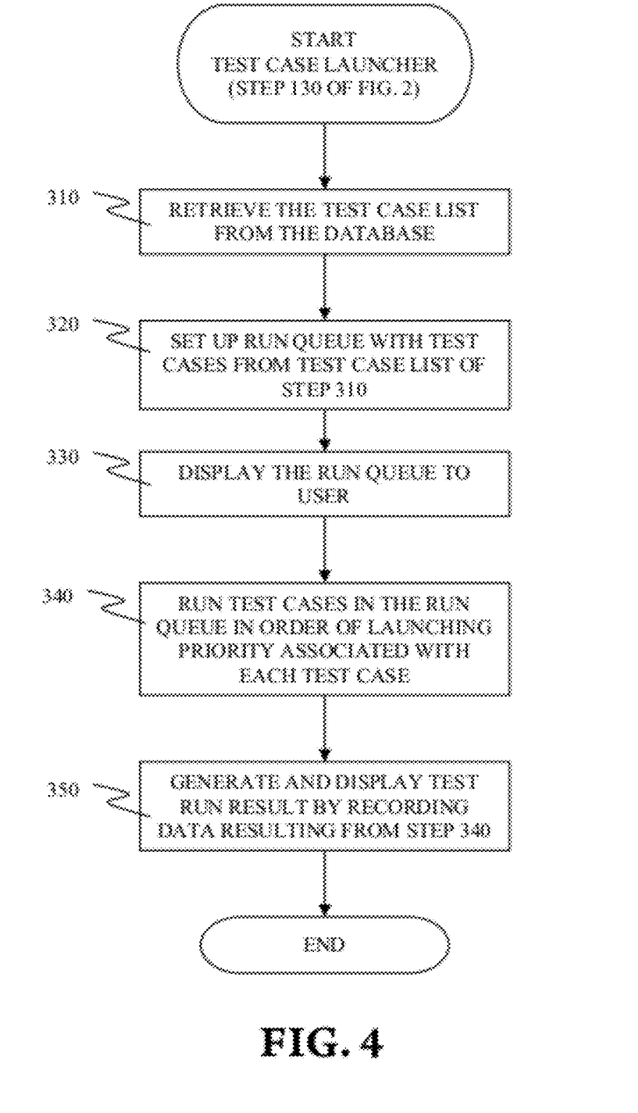
FIG. 4 is a flowchart depicting a method for performing entries of the test case list to generate a test run result, as performed by the test case launcher in step 130 of FIG. 2, in accordance with the embodiments of the present invention.

FIG. 4 is a flowchart depicting a method for performing entries of the test case list to generate a test run result, as performed by the test case launcher in step 130 of FIG. 2, supra, in accordance with the embodiments of the present invention.

In step 310, the test case launcher retrieves the test case list from the database and/or other high speed memory device as the impact analyzer had stored in step 270 of FIG. 3 supra. The test case launcher proceeds with step 320.

In step 320, the test case launcher sets up a run queue with test cases from the retrieved test case list. In one embodiment, the run queue is ordered based on launching priority of each test case in the test case list. The test case launcher proceeds with step 330.

In step 330, the test case launcher displays the run queue to the user. The test case launcher proceeds with step 340.

In step 340, the test case launcher runs the test cases in the run queue in order of respective launching priority associated with each test case. In one embodiment of the present invention, the test case launcher is configured to automatically run each test case in the run queue in asynchronous running mode. In another embodiment, the test case launcher is configured to prompt the user to select test case(s) for asynchronous testing regardless of the respective launching priority of each test case. Once the user selects a test case from the run queue, the test case launcher runs the selected test case in asynchronous running mode. The test case launcher proceeds with step 350.

In step 350, the test case launcher generates a test run result by recording data resulting from step 340 and/or storing the data in the database. The test case launcher completes processing of the test case list and the IDE tool proceeds with step 140 of FIG. 2, supra.

Figure 5:
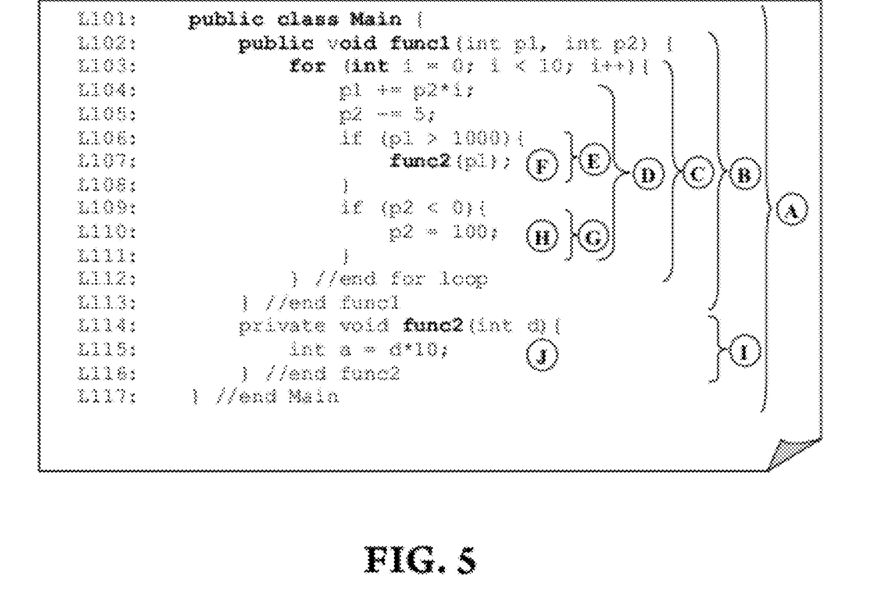
FIG. 5 is an example of the input code stored in the database, with a code block structure as built by the impact analyzer in step 220 of FIG. 3, in accordance with the embodiments of the present invention.

FIG. 5 is an example of the input code stored in the database, with a static code block structure as built by the impact analyzer in step 220 of FIG. 3, supra, in accordance with the embodiments of the present invention.

Lines L101 through L117 constitute a function Main ( ), which is a top-level code block "A" in a code block structure of Java programming language.

Lines L102 through L113 constitute a function func1( ), which is a first second-level code block "B" within the top-level code block "A".

Lines L103 through L112 constitute a for( ) loop, which is a first third-level code block "C" within the first second-level code block "B".

Lines L104 through L111 constitute a body of the for( ) loop, which is a fourth-level code block "D" within the first third-level code block "C".

Lines L106 through L108 constitute a first if( ) condition clause, which is a first fifth-level code block "E" within the fourth-level code block "D".

Line L107 constitutes a body of the first if( ) condition clause, which is represented by a first sixth-level code block "F" within the first fifth-level code block "E". The first sixth-level code block "F" will be performed when the condition "(p1>1000)" is met. The first sixth-level code block "F" invokes a function func2( ) starting at line L114.

Lines L109 through L111 constitute a second if( ) condition clause, which is a second fifth-level code block "G" within the fourth-level code block "D".

Line L110 constitutes a body of the second if( ) condition clause, which is represented by a second sixth-level code block "H" within the second fifth-level code block "G". The second sixth-level code block "H" will be performed when the condition "(p2<0)" is met. The second sixth-level code block "H" assigns a new value "100" to a variable p2.

Lines L114 through L116 constitute a function func2( ) which is a second second-level code block "I" within the top-level code block "A".

Line L115 constitutes a body of the function func2( ), which is represented by a second third-level code block "J" within the second second-level code block "I". The second second-level code block "I" will be performed when the function func2( ) is invoked from line L107.

Figure 5A:
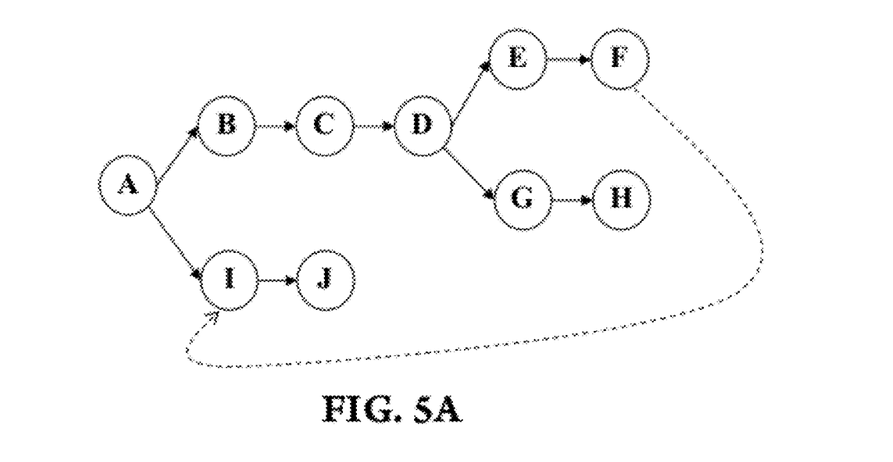
FIG. 5A illustrates various relationships among code blocks of FIG. 5, in accordance with the embodiments of the present invention.

FIG. 5A illustrates various relationships among code blocks of FIG. 5, supra, in accordance with the embodiments of the present invention.

In the embodiment same of the present invention, the static code block structure may be automatically analyzed by the impact analyzer and/or conventional static analysis tool based on a design of a programming language utilized. The Java code blocks A, B, C, D, E, F, G, H, I, and J of FIG. 5, supra, are hierarchically structured for a higher level code block to include, that is, to nest, a lower level code block. Solid arrows represent a static inclusion relationship among the code blocks, starting from a respective higher level code block and heading a respective lower level code block. The inclusion relationships shown in FIG. 5A are A→B→C→D→E→F, A→B→C→D→G→H, and A→I→J.

A dashed curve F to I represent that code block F invokes code block I, which is referred to as a dynamic invocation relationship among code blocks.

In the same embodiment of the present invention, test cases are automatically executable source codes in JUnit format. A first test case T1 is func1(1000, 2000), that is, invoking func1( ) with arguments int p1=1000, int p2=2000, and a performance sequence of the first test case T1 is (B–C–D–E–F–I–J), based on the inclusion relation and the invocation relation of FIG. 5 supra. A second test case T2 is func2(123), that is, invoking func2 ( ) with an argument int d=123, and a performance sequence of the second test case T2 is (I–J), based on the inclusion relation and the invocation relation of FIG. 5 supra.

When a user edited the code block J, because the second test case T2 is more directly associated with the code block J than the first test case T1, the impact analyzer assigns a launching priority higher than the first test case T1 to the second test case T2, indicating that updating the code block J affects the second test case T2 more than the first test case T1. According to a respective launching priority, the second test case T2 is performed first and then the first test case T1 is performed. In another embodiment of the present invention, the user may override the respective launching priority to tune an order of performing test cases.

Figure 5B:
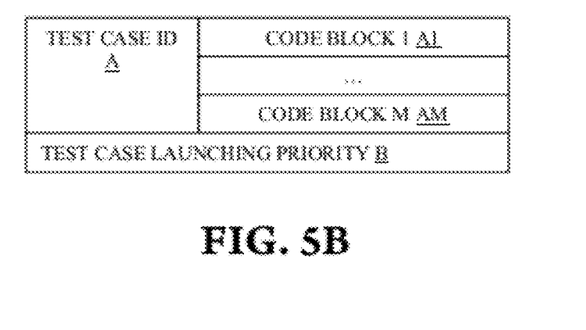
FIGS. 5B and 5C illustrate an example of a test case list created by the impact analyzer in step 260 of FIG. 3, in accordance with the embodiments of the present invention.
Figure 5C:
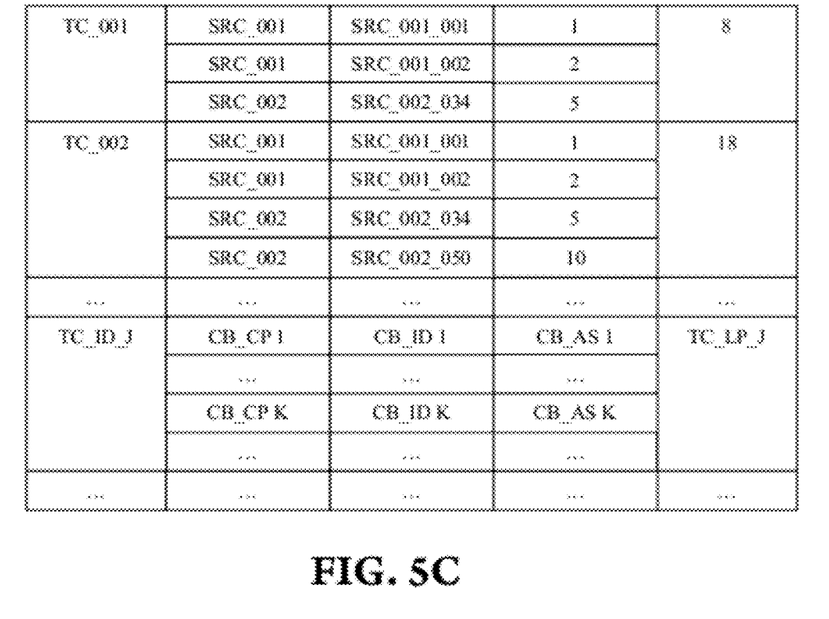

FIGS. 5B and 5C illustrate an example of a test case list created by the impact analyzer in step 260 of FIG. 3, in accordance with the embodiments of the present invention.

FIG. 5B is an exemplary test case format as an entry of the test case list, in accordance with the embodiments of the present invention.

A test case comprises a test case id A and a test case launching priority B. Each test case represented by the test case id A comprises m-number of code blocks A1 . . . Am, wherein m is a positive integer respective to each test case.

FIG. 5C illustrates an example of a test case list as stored in the database after the impact analyzer performs step 270 of FIG. 3, supra, in accordance with the embodiments of the present invention.

The test case list comprises n-number of test cases, wherein n is a positive integer. A j-th test case has m-number of code blocks, wherein m is a positive integer respective to j. A k-th code block in the j-th test case comprises code block identifier representing the code block denoted as CB_ID k, call path of the code block denoted as CB_CP k, and association strength between the code block and an updated code block denoted as CB_AS k. In this embodiment of the present invention, smaller value of the association strength indicates stronger association between two blocks, based on invocation and/or inclusion relationship.

In this example, a modified code block is identified as a first code block of a first source file denoted as SRC_001_001. A first test case comprises a test case id TC_001 and a launching priority of eight (8), a sum of all association strengths of three component code blocks. The first test case TC_001 comprises three code blocks represented by respective code block ids, SRC_001_001, SRC_001_002, and SRC_002_034.

A first code block SRC_001_001 is invoked through a first source file represented by call path SRC_001. The first code block SRC_001_001 has association strength of one (1), which is calculated by the inclusion depth of the first code block SRC_001_001.

A second code block SRC_001_002 of the first test case TC_001 is also invoked through a first source file represented by call path SRC_001. The second code block SRC_001_002 has association strength of two (2).

A third code block SRC_002_034 is invoked through a second source file represented by call path SRC_002. The third code block SRC_002_034 has association strength of five (5).

A second test case comprises a test case id TC_002 and a launching priority of eighteen (18), a sum of all association strengths of four component code blocks. The first test case TC_001 comprises four code blocks represented by respective code block ids, SRC_001_001, SRC_001_002, SRC_002_034, and SRC_002_050.

The first three code blocks are identical to the first test case TC_001. A fourth code block SRC_002_050 is invoked through the second source file represented by call path SRC_002. The fourth code block SRC_002_050 has association strength of ten (10), which indicates the fourth code block SRC_002_050 is weakly associated with the modified code block.

Between two test cases TC_001 and TC_002, the first test case TC_001 has a higher launching priority of eight (8), so the test case launcher performs the first test case TC_001 first and then performs the second test case TC_002.

In another embodiment of the present invention, each code block may comprise only code block id and association strength, wherein the impact analyzer includes call path information within the code block id and the test case launcher is enabled to decode the call path information from the code block id.

Figure 6:
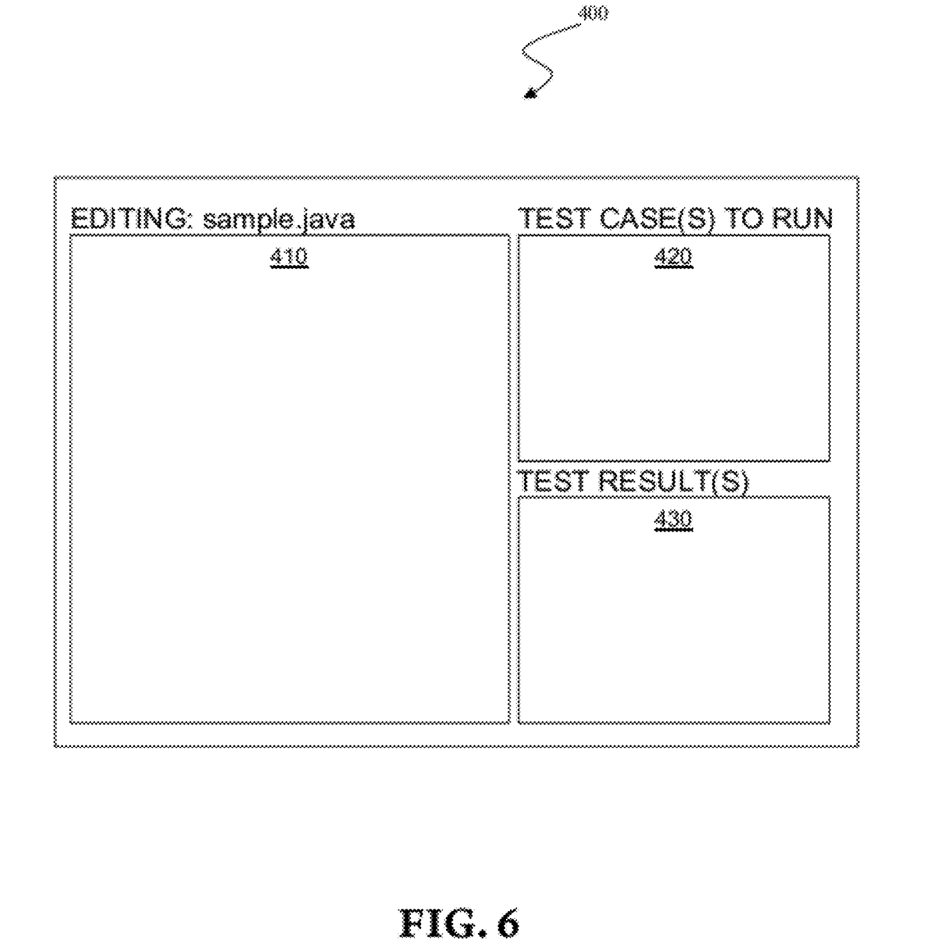
FIG. 6 illustrates a screen display of the Integrated Development Environment (IDE) tool of FIG. 1, in accordance with the embodiments of the present invention.

FIG. 6 illustrates a screen display 400 of the Integrated Development Environment (IDE) tool of FIG. 1, supra, in accordance with the embodiments of the present invention.

Frame 410 captioned "EDITING: sample.java" is a user window of the source code editor. Frame 410 displays the input code as shown in FIG. 5, supra, and enables a user to modify the input code within the window of frame 410. When the user completes updating of a programming element, the impact analyzer takes a second snapshot and identifies a modified code block by comparing the second snapshot with a first snapshot based on the code block structure of the input code.

Frame 420 captioned "TEST CASE(S) TO RUN" is a display window of the run queue of the test case launcher, as a result of performing step 330 of FIG. 4 supra. In one embodiment of the present invention, the test case launcher displays a respective test case id and a brief description for each test case. Examples of description for test case may be inter alia, "Normal system test for func1( )", "Abnormal system test for func2( )", "External invocation test", etc.

Frame 430 captioned "TEST RESULT(S)" is a display window of the test run results generated by the test case launcher. The test run result may indicate whether or not the test case is succeed, failed test case identifier and predefined error code, missing data item, etc.

Figure 7:
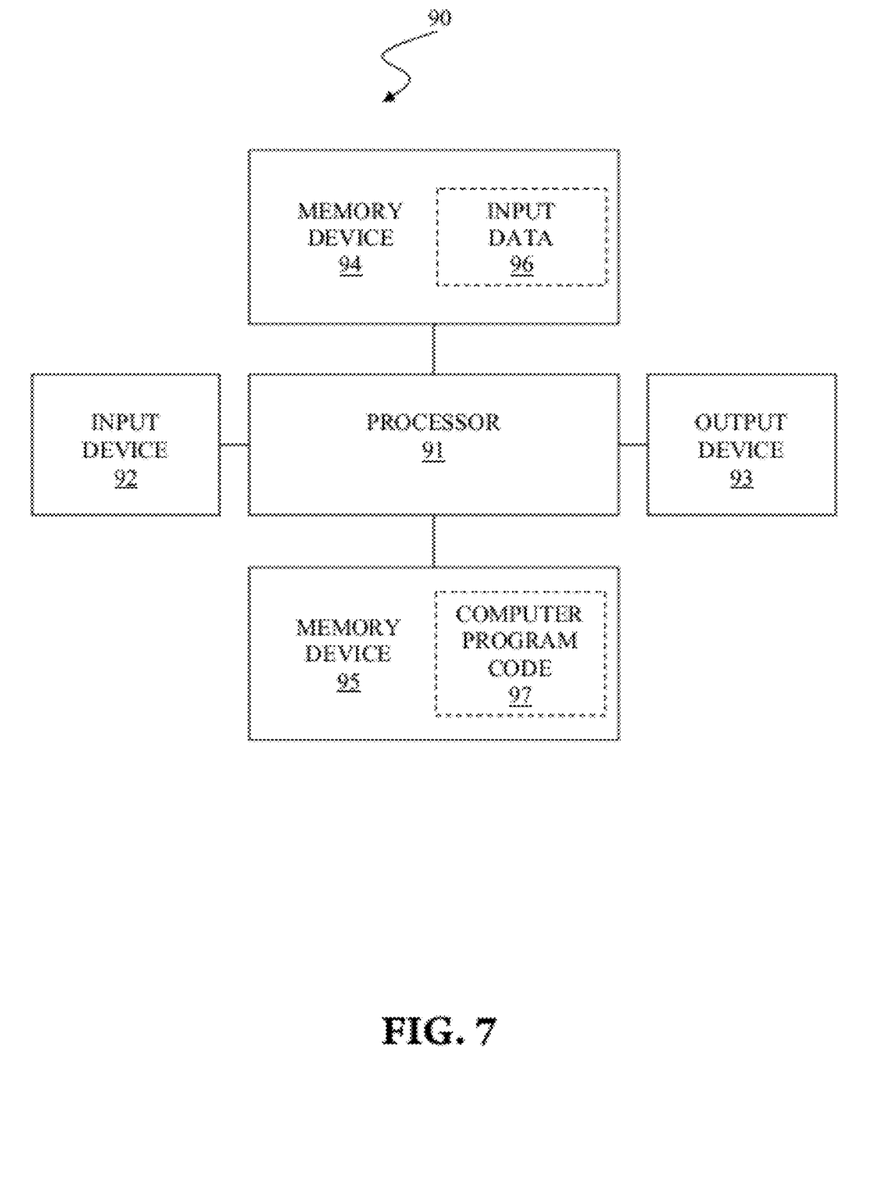
FIG. 7 illustrates a computer system used for asynchronous code testing in an Integrated Development Environment (IDE), in accordance with the embodiments of the present invention.

FIG. 7 illustrates a computer system 90 used for asynchronous code testing in an Integrated Development Environment (IDE), in accordance with the embodiments of the present invention.

The computer system 90 comprises a processor 91, an input device 92 coupled to the processor 91, an output device 93 coupled to the processor 91, and memory devices 94 and 95 each coupled to the processor 91. In this specification, the computer system 90 represents any type of programmable data processing apparatus.

The input device 92 is utilized to receive input data 96 into the computer system 90. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 is utilized to communicate results generated by the computer program code 97 to a user of the computer system 90. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

Any of the components of the present invention can be deployed, managed, serviced, etc. by a service provider that offers to deploy or integrate computing infrastructure with respect to a process for asynchronous code testing in an Integrated Development Environment (IDE) of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for asynchronous code testing in an Integrated Development Environment (IDE).

In another embodiment, the invention provides a method that performs the process steps of the invention on a subscription, advertising and/or fee basis. That is, a service provider, such as a Solution Integrator, can offer to create, maintain, support, etc., a process for asynchronous code testing in an Integrated Development Environment (IDE) of the present invention. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. In this specification, the term "memory device" 94, 95 represents a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code 97 for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer program code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer program code" 97 in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for asynchronous code testing in an Integrated Development Environment (IDE), said method comprising:

creating, by a processor of a computer system that hosts the IDE, an input code based on inputs provided by a user;

said processor storing the input code in a database coupled to the computer system, said input code comprising a plurality of code blocks organized in a hierarchy of nesting levels characterized by respective nesting level numbers that increase with increasing separation of each respective nesting level from a reference level of the total input code;

said processor receiving, from the user, a modification of at least one code block of the plurality of code blocks of the input code;

said processor generating at least one modified code block respectively corresponding to the received modification;

said processor generating a test case list of test cases from the input code by use of an impact analyzer comprised by the IDE, wherein each test case of the test case list comprises a respective test case identifier and a respective launching priority, wherein the respective launching priority quantifies how strongly each test case is associated with the at least one modified code block, wherein each test case is uniquely identified by the respective test case identifier, and wherein said generating the test case list comprises generating the test cases and determining the respective launching priority for each test case by (i) determining an association strength of each modified code block as measured by the nesting level in the hierarchy of each modified code block such that the association strength decreases as the nesting level increases for each modified code block and (ii) computing the launching priority as a sum of the association strengths of the modified code blocks;

said processor producing a test run result for the at least one modified code block by asynchronously running the test cases of the test case list in a sequential order of increasing launching priority of the test cases; and said processor displaying the test run result to the user via a graphical user interface (GUI) of the computer system.

2. The method of claim 1, said generating the at least one modified code block comprising:

taking a first snapshot of the input code resulting from said creating, wherein the first snapshot is a portion of a run stack of the impact analyzer;

building a code block structure of the input code by parsing the first snapshot;

taking a second snapshot of the input code with respect to the modification of the at least one code block; and determining the at least one modified code block by comparing the first snapshot and the second snapshot.

3. The method of claim 1, said method further comprising, for each test case:

storing the test case list in the database.

4. The method of claim 3, said producing the test run result comprising:

retrieving the test case list from the database, wherein the database is enabled for real-time memory operations;

setting a run queue with the test cases of the retrieved test case list;

displaying the run queue to the user by use of the GUI;

asynchronously running the test cases from the displayed run queue in the sequential order of increasing launching priority of the test cases;

generating the test run result from said asynchronously running the test cases, wherein the test run result comprises the test case identifier and an indication as to whether each test case is successful or has failed.

5. The method of claim 1, said method further comprising:

providing at least one support service for at least one of creating, integrating, hosting, maintaining, and deploying computer-readable program code in the computer system, said program code being executed by the processor to implement said creating the input code, said storing the input code, said receiving the modification of the code block of the input code, said generating the test case list of test cases, said producing the test run result for the modified code block, and said communicating the test run result to the user.

6. A computer program product comprising:

a computer readable hardware memory device not being a signal and storing a computer readable program code embodied therein, said computer readable program code containing instructions that, upon being executed by a processor of a computer system that hosts an Integrated Development Environment (IDE), perform a method for asynchronous code testing in the IDE, said method comprising:

said processor creating an input code based on inputs provided by a user said input code comprising a plurality of code blocks organized in a hierarchy of nesting levels characterized by respective nesting level numbers that increase with increasing separation of each respective nesting level from a reference level of the total input code;

said processor receiving, from the user, a modification of at least one code block of the plurality of code blocks of the input code;

said processor generating at least one modified code block respectively corresponding to the received modification;

said processor generating a test case list of test cases from the input code by use of an impact analyzer comprised by the IDE, wherein each test case of the test case list comprises a respective test case identifier and a respective launching priority, wherein the respective launching priority quantifies how strongly each test case is associated with the at least one modified code block, wherein each test case is uniquely identified by the respective test case identifier, and wherein said generating the test case list comprises generating the test cases and iii determining the respective launching priority for each test case by (i) determining an association strength of each modified code block as measured by the nesting level in the hierarchy of each modified code block such that the association strength decreases as the nesting level increases for each modified code block and (ii) computing the launching priority as a sum of the association strengths of the modified code blocks;

said processor producing a test run result for the at least one modified code block by asynchronously running the test cases of the test case list in a sequential order of increasing launching priority of the test cases; and said processor displaying the test run result to the user via a graphical user interface (GUI) of the computer system.

7. The computer program product of claim 6, said generating the modified code block comprising:

taking a first snapshot of the input code resulting from said creating, wherein the first snapshot is a portion of a run stack of the impact analyzer;

building a code block structure of the input code by parsing the first snapshot;

taking a second snapshot of the input code with respect to the modification of the at least one code block; and determining the at least one modified code block by comparing the first snapshot and the second snapshot.

8. The computer program product of claim 6, said method further comprising, for each test case:

storing the test case list in the database.

9. The computer program product of claim 8, said producing the test run result comprising:

retrieving the test case list from the database, wherein the database is enabled for real-time memory operations;

setting a run queue with the test cases of the retrieved test case list;

displaying the run queue to the user by use of the GUI;

asynchronously running the test cases from the displayed run queue in the sequential order of increasing launching priority of the test cases;

generating the test run result from said asynchronously running the test cases, wherein the test run result comprises the test case identifier and an indication as to whether each test case is successful or has failed.

10. A computer system comprising a processor and a computer readable memory unit coupled to the processor, said computer readable memory unit containing instructions that when run by the processor implement a method for asynchronous code testing in an Integrated Development Environment (IDE) that hosts the computer system, said method comprising:

said processor creating an input code based on inputs provided by a user, said input code comprising a plurality of code blocks organized in a hierarchy of nesting levels characterized by respective nesting level numbers that increase with increasing separation of each respective nesting level from a reference level of the total input code;

said processor receiving, from the user, a modification of at least one code block of the plurality of code blocks of the input code;

said processor generating at least one modified code block respectively corresponding to the received modification;

said processor generating a test case list of test cases from the input code by use of an impact analyzer comprised by the IDE, wherein each test case of the test case list comprises a respective test case identifier and a respective launching priority, wherein the respective launching priority quantifies how strongly each test case is associated with the at least one modified code block, wherein each test case is uniquely identified by the respective test case identifier, and wherein said generating the test case list comprises generating the test cases and determining the respective launching priority for each test case by (i) determining an association strength of each modified code block as measured by the nesting level in the hierarchy of each modified code block such that the association strength decreases as the nesting level increases for each modified code block and (ii) computing the launching priority as a sum of the association strengths of the modified code blocks;

said processor producing a test run result for the at least one modified code block by asynchronously running the test cases of the test case list in a sequential order of increasing launching priority of the test cases; and said processor displaying the test run result to the user via a graphical user interface (GUI) of the computer system.

11. The computer system of claim 10, said generating the modified code block comprising:

taking a first snapshot of the input code resulting from said creating, wherein the first snapshot is a portion of a run stack of the impact analyzer;

building a code block structure of the input code by parsing the first snapshot;

taking a second snapshot of the input code with respect to the modification of the at least one code block; and determining the at least one modified code block by comparing the first snapshot and the second snapshot.

12. The computer system of claim 10, said method further comprising, for each test case:

storing the test case list in the database.

13. The computer system of claim 12, said producing the test run result comprising:

retrieving the test case list from the database, wherein the database is enabled for real-time memory operations;

setting a run queue with the test cases of the retrieved test case list;

displaying the run queue to the user by use of the GUI;

asynchronously running the test cases from the displayed run queue in the sequential order of increasing launching priority of the test cases;

generating the test run result from said asynchronously running the test cases, wherein the test run result comprises the test case identifier and an indication as to whether each test case is successful or has failed.

\* \* \* \* \*